(12) United States Patent
Terentiv et al.

(10) Patent No.: US 12,538,091 B2
(45) Date of Patent: Jan. 27, 2026

(54) METHODS, APPARATUS AND SYSTEMS FOR MODELLING AUDIO OBJECTS WITH EXTENT

(71) Applicant: DOLBY INTERNATIONAL AB, Dublin (IE)

(72) Inventors: Leon Terentiv, Erlangen (DE); Daniel Fischer, Fuerth (DE); Panji Setiawan, Munich (DE); Christof Fersch, Neumarkt (DE)

(73) Assignee: DOLBY INTERNATIONAL AB, Dublin (IE)

( * ) Notice: Subject to any disclaimer, the term of this patent is extended or adjusted under 35 U.S.C. 154(b) by 119 days.

(21) Appl. No.: 18/557,590

(22) PCT Filed: Apr. 28, 2022

(86) PCT No.: PCT/EP2022/061331
§ 371 (c)(1),
(2) Date: Oct. 27, 2023

(87) PCT Pub. No.: WO2022/229319
PCT Pub. Date: Nov. 3, 2022

(65) Prior Publication Data
US 2024/0223987 A1 Jul. 4, 2024

Related U.S. Application Data

(60) Provisional application No. 63/247,156, filed on Sep. 22, 2021, provisional application No. 63/181,865, filed on Apr. 29, 2021.

(30) Foreign Application Priority Data

Sep. 30, 2021 (EP) ...................................... 21200055

(51) Int. Cl.
*H04S 7/00* (2006.01)
(52) U.S. Cl.
CPC ........... *H04S 7/303* (2013.01); *H04S 2400/11* (2013.01)
(58) Field of Classification Search
CPC .............................. H04S 7/303; H04S 2400/11
(Continued)

(56) References Cited

U.S. PATENT DOCUMENTS 8,659,593 B2   2/2014   Furukawa
9,607,428 B2   3/2017   Li
(Continued)

FOREIGN PATENT DOCUMENTS

JP   2017175356 A   9/2017
JP   2019134314 A   8/2019
(Continued)

*Primary Examiner* — William J Deane, Jr.

(57) ABSTRACT

A method of modelling extended audio objects for audio rendering in a virtual or augmented reality environment is described. The method comprises obtaining an extent representation indicative of a geometric form of an extended audio object and information relating to one or more first audio sources that are associated with the extended audio object. Furthermore, the method comprises obtaining a relative point on the geometric form of the extended audio object based on a user position in the virtual or augmented reality environment. The method also comprises determining an extent parameter for the extent representation based on the user position and the relative point and determining positions of one or more second audio sources, relative to the user position, for modelling the extended audio object. In addition, the method comprises outputting a modified representation of the extended audio object for modelling the extended audio object.

18 Claims, 7 Drawing Sheets

(58) Field of Classification Search
USPC .............................................. 381/17, 20, 22
See application file for complete search history.

(56) References Cited

U.S. PATENT DOCUMENTS

| | | | |
|---|---|---|---|
| 10,346,999 | B2 | 7/2019 | Wexler |
| 10,425,762 | B1* | 9/2019 | Schissler ................. H04S 7/303 |
| 10,679,076 | B2 | 6/2020 | Kimura |
| 10,964,042 | B2 | 3/2021 | Sugimura |
| 10,972,856 | B2 | 4/2021 | Suenaga |
| 2008/0278486 | A1 | 11/2008 | Royan |
| 2009/0201288 | A1 | 8/2009 | Fischer |
| 2012/0206452 | A1* | 8/2012 | Geisner ................... G06F 3/013 |
| | | | 345/419 |
| 2018/0077513 | A1* | 3/2018 | Link ...................... G02B 27/017 |
| 2018/0213344 | A1* | 7/2018 | Laaksonen .............. G06F 3/012 |
| 2020/0128347 | A1 | 4/2020 | Schissler |
| 2020/0275233 | A1 | 8/2020 | Mason |
| 2020/0326430 | A1 | 10/2020 | Nichols |
| 2020/0330003 | A1 | 10/2020 | Zakharov |
| 2020/0404442 | A1 | 12/2020 | Suenaga |
| 2021/0092546 | A1* | 3/2021 | Terentiv .................. H04S 7/303 |
| 2021/0120360 | A1 | 4/2021 | Terentiv |
| 2022/0312142 | A1* | 9/2022 | Leppanen ............... H04S 7/303 |
| 2023/0088922 | A1* | 3/2023 | De Bruijn ................ G06F 3/165 |
| 2023/0132745 | A1* | 5/2023 | Falk ...................... G06T 19/006 |
| | | | 381/1 |

FOREIGN PATENT DOCUMENTS

| | | |
|---|---|---|
| RU | 2537044 C2 | 7/2013 |
| RU | 2671627 C2 | 6/2017 |
| WO | 2020127329 A1 | 6/2020 |

* cited by examiner

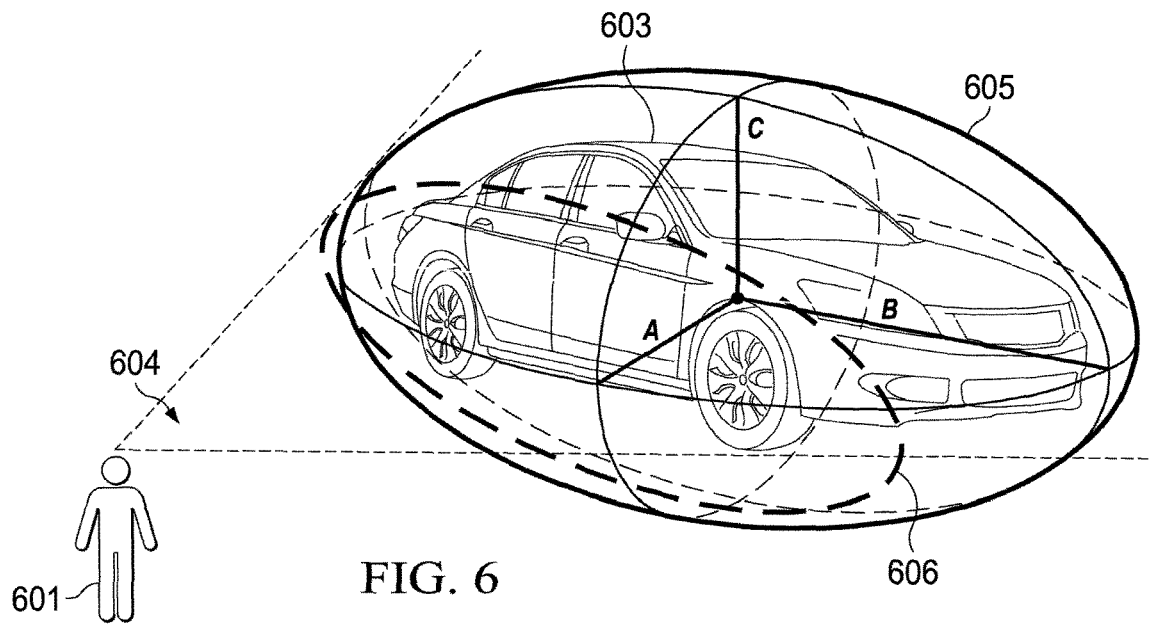
FIG. 6
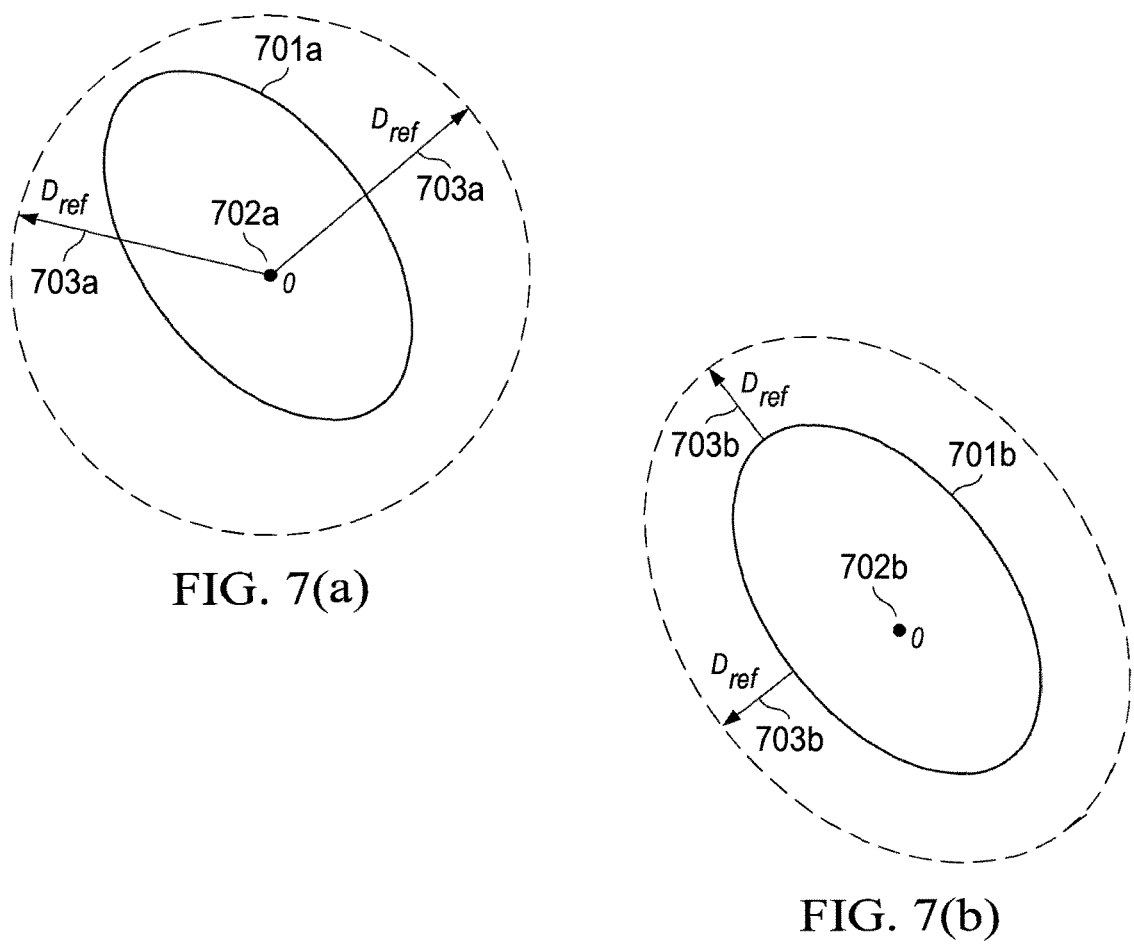
FIG. 7(a)
FIG. 7(b)

METHODS, APPARATUS AND SYSTEMS FOR MODELLING AUDIO OBJECTS WITH EXTENT

CROSS-REFERENCE TO RELATED APPLICATIONS

This is a national phase application of the PCT patent application No. PCT/EP2022/061331, having an international filing date of Apr. 28, 2022, which claims priority to U.S. provisional application 63/181,865, filed 29 Apr. 2021 and U.S. provisional application 63/247,156, filed 22 Sep. 2021 and EP Application Serial No. 21200055.8 (reference: D21045EP), filed on 30 Sep. 2021.

TECHNICAL FIELD

The present document relates to object-based audio rendering, and more particularly, to rendering audio objects with extent in a virtual reality (VR) environment.

BACKGROUND

The new MPEG-I standard enables an acoustic experience from different viewpoints and/or perspectives or listening positions by supporting a full six degrees of freedom (6DoF) in Virtual reality (VR), augmented reality (AR), mixed reality (MR) and/or extended reality (XR) applications. A 6 DoF interaction extends a 3 DoF spherical video/audio experience that is limited to head rotations (pitch, yaw, and roll) to include translational movement (forward/back, up/down, and left/right), to allow for navigation within a virtual environment (e.g., physically walking inside a room), in addition to the head rotations.

For audio rendering in VR applications, object-based approaches have been widely employed by representing a complex auditory scene as multiple separate audio objects, each of which is associated with parameters or metadata defining a location/position and trajectory of that object in the scene. Instead of being a point audio source, an audio object may be provided with a spatial extent which reflects auditory perception obtained from that audio object. Such audio objects may emit one or more sound sources which is/are to be rendered in the VR implementation.

In order to create 6 DoF experiences being natural and realistic to a listener, a listener's experience of directionality and a spatial extent of sound or audio sources (objects) are critical for the 6 DoF rendering, particularly for realizing an experience of navigation through a scene and around virtual audio sources. Since the 6 DoF rendering involves additionally larger translational changes of the listening position of a listener, the complex interplay between a constantly-changing listening position and an audio object extent with sophisticated structure may lead to difficulties in 6 DoF rendering implementations. In particular, increased number of parameters are required for modelling such position-object interplay, which causes very high computational complexity in the corresponding audio processing.

It may be noted that available audio rendering systems (such as the MPEG-H 3D audio renderer) are typically limited to the rendering of 3 DoFs (i.e. rotational movement of an audio scene caused by a head movement of a listener) which does not consider translational changes of the listening position of a listener. Even 3 DoF+ merely adds small translational changes of the listening position of a listener, but without taking into account larger translational movement of a listener. Hence, the existing techniques failing to consider larger translational movement of a listener may encounter difficulties in truly immersive rendering of 6 DoF sound.

Thus, there is a need for providing a simple way to implement 6 DoF rendering of an audio object. In particular, it may be desirable to simplify modelling of the (spatial) extent of an audio object taking account of significant user movement for 6 DoF rendering.

SUMMARY

According to an aspect, a (e.g., computer-implemented) method of modelling extended audio objects for audio rendering in a virtual or augmented reality environment (or in general, computer-mediated reality environment) is described. The method may include obtaining an extent representation indicative of a geometric form of an extended audio object and information relating to one or more first audio sources that are associated with the extended audio object. The one or more first audio sources may be captured, using audio sensors, as a recorded audio source associated with the extended audio object. Specifically, the method may include obtaining a relative point using the (e.g., extent representation indicative of the) geometric form of the extended audio object based on a user position (i.e. a listening position of a listener) in the virtual or augmented reality environment. In addition, the method may include determining an extent parameter for the extent representation based on the user position and the relative point.

In particular, the extent parameter may describe a spatial extension of the extended audio object perceived at the user position. Thus, it may be understood that such spatial extension of the extended audio object may vary according to the user position and the extended audio object may be modelled adaptively for various user positions. For effectively modelling the extended audio object, the method may also include determining positions of one or more second audio sources, relative to the user position. Such one or more second audio sources may be regarded as virtual, reproduced audio source for modelling the extended audio object at a corresponding user position. Furthermore, the method may include outputting a modified representation of the extended audio object for modelling the extended audio object. It may be noted that the modified representation includes the determined extent parameter and positions of the one or more second audio sources.

Configured as above, the proposed method allows to model the extended audio object with simple parameters. In particular, with the knowledge of a spatial extent of the extended audio object and the corresponding positions of the second (virtual) audio source(s) as calculated for a given user position, the extended audio object can be effectively modelled to have an appropriate (perception) size that corresponds to the given user position, which may be applicable to subsequent rendering (e.g. 6DoF) of the extended audio object. Thereby, the computational complexity of the audio rendering can be reduced since the detailed information regarding the form/position/orientation of the audio object and the movement of the user position may not be required.

In other words, the proposed method effectively converts 6DoF data (e.g. input audio object sources, user position, extent geometry of the object, extent position/orientation of the object, etc.) into simple information as input for an extent modeling interface/tool, which allows efficient 6DoF rendering of an audio object without processing huge amounts of data to be necessary.

In an embodiment, the extent representation indicative of the geometric form of the extended audio object corresponds to (coincides with) the geometric form of the extended audio object. For example, for relatively simple geometric forms, the geometric form of the extended audio objects may be used as extent representation.

In an embodiment, the extent parameter may be determined further based on a position and/or an orientation of the extended audio object. Also, the method may further include determining the one or more second audio sources for modelling the extended audio object based on the one or more first audio sources. According to the embodiment, the method may further include determining an extent angle based on the user position, the relative point, and the position and/or orientation of the extended audio object. For example, the extent angle may be an arc measure that indicates a spatial extension of the extended audio object perceived at the user position. The extent angle may therefore refer to a relative arc measure (i.e., a relative extent angle) that depends on the relative point, and the position and/or orientation of the extended audio object. In this case, the extent parameter may be determined based on the (relative) extent angle.

Configured as above, the proposed method provides a simplified methodology for obtaining an accurate estimation of a spatial extent/perception size of an audio object at different user positions, thereby improving the performance in modelling the audio object, using simple parameters.

In an embodiment, determining the positions of the one or more second audio sources may include determining a circle arc based on the user position, the relative point, and the geometric form of the extended audio object. In addition, determining the positions of the one or more second audio sources may further include positioning the determined one or more second audio sources on the circle arc. Furthermore, the circle arc may include an arc that relates to the (relative) extent angle as a corresponding arc measure at the user position and may be determined based on the extent angle and the user position. In an embodiment, the positioning may involve equidistantly distributing all the second audio sources on the circle arc. Also, the positioning may be dependent on a correlation level between the second audio sources and/or a content creator's intent. In other words, the second audio sources may be placed on the circle arc with proper distance spacing determined based on a correlation level between the second audio sources and/or a content creator's intent.

In an embodiment, the extent parameter may be determined further based on a number (i.e., count) of the determined one or more second audio sources. Notably, the number of the determined one or more second audio sources may be a predetermined constant independent of the user position and/or the relative point. Alternatively, determining the one or more second audio sources for modelling the extended audio object may include determining the number of the one or more second audio sources based on the (relative) extent angle. In this case, the number of the one or more second audio sources may increase as the extent angle increases (i.e., the number may be positively correlated with the extent angle). More specifically, determining the one or more second audio sources for modelling the extended audio object may further include replicating the one or more first audio sources or adding weighted mixes of the one or more first audio sources, and applying a decorrelation process to the replicated or added first audio sources. That is, the first audio source(s) may be replicated or their weighted mixes may be added to obtain the determined number of the second audio sources.

Configured as above, by properly defining the second (virtual) audio sources, the method allows to model an audio object in an accurate and adaptable manner. In particular, the modelling can be effectively performed for various user positions, for audio objects with different input sources and forms/positions, and intents of content creators.

In an embodiment, the extent representation may indicate a two-dimensional or a three-dimensional geometric form for representing a spatial extension of the extended audio object. Furthermore, the extended audio object may be oriented in two or three dimensions. Also, the spatial extension of the extended audio object perceived at the user position may be described as a perceived width, size, and/or massiveness of the extended audio object.

The relative point may be obtained closest to the user position in the virtual or augmented reality environment, using (e.g., the extent representation indicative of) the geometric form of the extended audio object.

Notably, the relative point may be a point on the (e.g., extent representation indicative of the) geometric form of the extended audio object closest to the user position.

The inventors have surprisingly found that using a relative point closest to the user position to model the extended audio object, leads to a better control of the attenuation of the audio level for different user positions relative to the extended audio object, and therefore to a better modelling of the extended audio object.

In an embodiment, obtaining the relative point using the extent representation indicative of the geometric form of the extended audio object comprises obtaining the relative point on the geometric form or obtaining the relative point at a distance away from the geometric form or extent representation. For example, the relative point may be located on the geometric form. Alternatively, the relative point may be located at a distance away from the extent representation or geometric form. For example, the relative point may be located at a distance away from a boundary or an origin of the extent representation or geometric form.

In an embodiment, the method may further include obtaining an orthogonal projection of the extended audio object on a projection plane orthogonal to a first line connecting the user position and the relative point. The method may also include determining, on the orthogonal projection, a plurality of boundary points identifying a projection size of the extended audio object. In this case, the (relative) extent angle may be determined using the user position and the plurality of boundary points. For example, the extent angle may be determined by connecting two boundary points with the user position and determining an angle between two straight lines connecting the respective boundary points with the user position as the extent angle.

Specifically, determining the plurality of boundary points may include obtaining a second line relating to a horizontal projection size of the extended audio object. Accordingly, the plurality of boundary points may include a left-most boundary point and a right-most boundary point of the orthogonal projection on the second line. Depending on an orientation of the extended audio object, the horizontal projection size may be a maximum size of the extended audio object. In some embodiments, the extended audio object may have a complex geometric form and the orthogonal projection may include a simplified projection of the extended audio object having a complex geometry. In this case, the method may further include obtaining a simplified geometric form of the extended audio object for use in determining the relative point prior to obtaining the relative point on the geometric form of the extended audio object.

Configured as above, the method enables simplifying the estimation of a spatial extent/perception size of an audio object with various geometric forms while providing sufficient accuracy in modelling the audio object using simple parameters.

In an embodiment, the method may further include rendering the extended audio object based on the modified representation of the extended audio object. The extended audio object may be rendered using the determined positions of the one or more second audio sources and the extent parameter. In particular, the rendering may comprise 6DoF audio rendering. The method may further include obtaining the user position, a position, and/or an orientation and a geometry of the extended audio object for the rendering.

In an embodiment, the method may further include controlling a perceived size of the extended audio object using the extent parameter. Accordingly, the extended audio object may be modelled as a point source or a wide source by controlling the perceived size of the extended audio object. It may be noted that the positions of the one or more second audio sources may be determined so that all the second audio sources have a same reference distance from the user position.

By the above configuration, the extended audio object can be effectively modelled using simple parameters. In particular, the spatial extent of the extended audio object and the corresponding positions of the second (virtual) audio source(s) are calculated for a given user position to allow an accurate estimation of an appropriate (perception) size of the audio object that corresponds to the given user position (i.e., the spatial extent size which may be perceived at the user position). Because the detailed information regarding the form/position/orientation of the audio object and the movement of the user position may not be required for the modelling, the processing for a subsequent rendering (e.g., 6DoF rendering) of the audio object may be simplified accordingly.

In other words, the proposed method provides an automatic conversion of 6DoF data (e.g., input audio object sources, user position, extent geometry of the object, extent position/orientation of the object, etc.) for audio extent modelling which may require simple parameters as input interface data, further allowing efficient 6DoF rendering of an audio object without complex data processing.

According to another aspect, an apparatus for modelling extended audio objects for audio rendering in a virtual or augmented reality environment (or in general, computer-mediated reality environment) is described. The apparatus may include a processor and a memory coupled to the processor and storing instructions for the processor. The processor may be configured to obtain an extent representation indicative of a geometric form of an extended audio object and information relating to one or more first audio sources that are associated with the extended audio object. The one or more first audio sources may be captured using audio sensors as a recorded audio source associated with the extended audio object. Specifically, the processor may be configured to obtain a relative point on the geometric form of the extended audio object based on a user position in the virtual or augmented reality environment. In addition, the processor may be configured to determine an extent parameter for the extent representation based on the user position and the relative point.

Notably, the extent parameter may describe a spatial extension of the extended audio object perceived at the user position. Thus, it may be understood that such spatial extension of the extended audio object may vary according to the user position and the extended audio object may be modelled adaptively for various user positions. Furthermore, the processor may be configured to determine positions of one or more second audio sources, relative to the user position, for modelling the extended audio object. Such one or more second audio sources may be regarded as a virtual, reproduced audio source for modelling the extended audio object at a corresponding user position. Also, the processor may be configured to output a modified representation of the extended audio object for modelling the extended audio object. In particular, the modified representation may include the extent parameter and the positions of the one or more second audio sources.

Configured as above, the proposed apparatus effectively converts 6DoF data (e.g., input audio object sources, user position, extent geometry of the object, extent position/orientation of the object, etc.) into simple information/parameters as input for an extent modeling interface/tool, which allows efficient 6DoF rendering of an audio object without processing huge amount of data to be necessary.

In particular, with the knowledge of a spatial extent of the extended audio object and the corresponding positions of the second (virtual) audio source(s) as calculated for a given user position, the extended audio object can be effectively modelled to have an appropriate (perceived) size that corresponds to the given user position, which may be applicable to subsequent rendering (e.g. 6DoF) of the extended audio object. Thereby, the computational complexity of the audio rendering can be reduced since the detailed information regarding the form/position/orientation of the audio object and the movement of the user position may not be required.

According to another aspect, a system for implementing audio rendering in a virtual or augmented reality environment (or in general, computer-mediated reality environment) is described. The system may include said proposed apparatus (e.g., as described above) and an extent modelling unit. The extent modelling unit may be configured to receive information relating to the modified representation of the extended audio object as described above from said apparatus. Additionally, the extent modelling unit may be configured to further control an extent size of the extended audio object based on said information relating to the modified representation (e.g., the extent parameter included in the modified representation). In some embodiments, the system may be or may be part of a user virtual reality console (e.g., a headset, computer, mobile phone or any other audio rendering devices for rendering audio in a virtual and/or augmented reality environment). In some embodiments, the system may be configured to transmit said information relating to the modified representation and/or the controlled extent size of the extended audio object to an audio output.

According to a further aspect, a computer program is described. The computer program may comprise executable instructions for performing the method steps outlined throughout the present disclosure when executed by a computing device.

According to another aspect, a computer-readable storage medium is described. The storage medium may store a computer program adapted for execution on a processor and for performing the method steps outlined throughout the present disclosure when carried out on the processor.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

It will be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) (and, e.g., their steps) are understood to likewise apply to the corresponding apparatus (and, e.g., their blocks, stages, units), and vice versa.

BRIEF DESCRIPTION OF THE DRAWINGS

The invention is explained below in an exemplary manner with reference to the accompanying drawings, wherein

FIG. 6 illustrates another schematic view for determining a modified representation of the extended audio object as conducted in the method 300 according to embodiments of the disclosure:

FIGS. 7(a)-(b) illustrate definitions of reference distance for object sources with extent.

DETAILED DESCRIPTION

Figure 1:
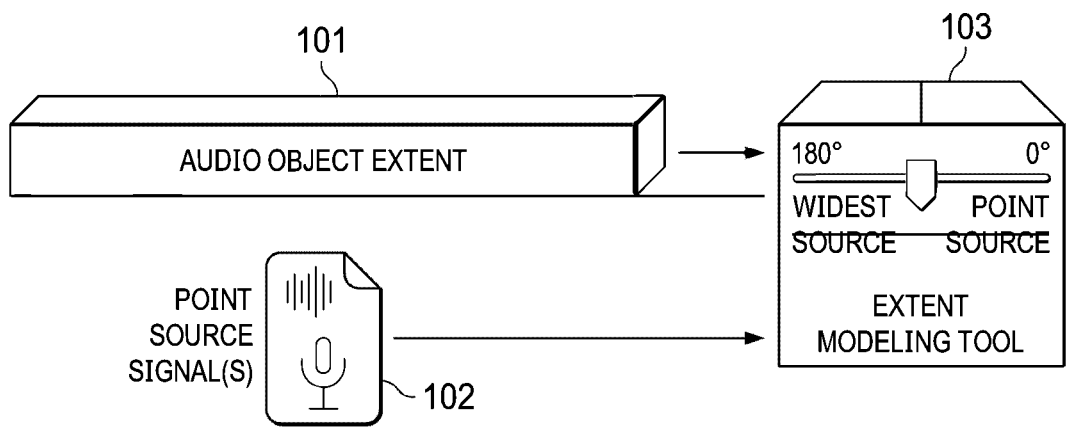
FIG. 1 illustrates a conceptual diagram of an example extent modelling tool according to embodiments of the disclosure.

As outlined above, the present disclosure relates to effective modelling of an audio object with extent for audio rendering in a virtual and/or augmented reality environment (or computer-mediated reality environment in general). FIG. 1 illustrates a conceptual diagram of an example extent modelling tool according to embodiments of the disclosure. Herein, an extended audio object 101 to be modelled is associated with one or more audio sources 102 that may be captured using audio sensors (such as microphones, for example) as recorded audio source(s). In general, the extended audio object 101 may be regarded as an audio object with extent having a geometric form. It may be provided with an extent representation indicating the geometric form and information relating to the one or more audio sources 102. Besides, the one or more audio sources 102 may, for example, comprise one or more point source signals associated with the extended audio object 101. An extent modelling tool 103 may model the extended audio object 101 based on the information regarding the form of the extended audio object 101 and the one or more audio sources 102. For example, the positions of the one or more audio sources 102 may be contained in the extent representation. The one or more audio sources 102 themselves may or may not be contained in the extent representation.

The extent modelling tool 103 may also model the extended audio object 101 based on a user position (e.g., a listening position of a listener) in the virtual and/or augmented reality environment. That is, depending on the user position, the extended audio object 101 may be modelled as an audio source having different extent sizes (e.g., a wide source or a point source). This may be achieved by providing a modified representation of the extended audio object 101 for a particular user position based on the (original) extent representation. Accordingly, the extended audio object 101 can be effectively modelled as having different extent sizes experienced/perceived at different user positions via the respective modified representations.

Figure 2A:
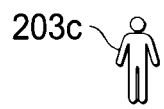
FIG. 2(a) illustrates an example audio scene including different user positions for implementing audio rendering of an extended audio object according to embodiments of the disclosure.
Figure 2A:
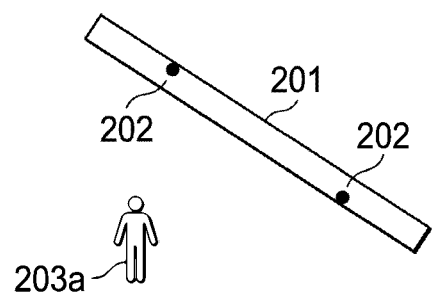
Figure 2A:

FIG. 2(a) illustrates an example audio scene including different user positions for implementing audio rendering of an extended audio object according to embodiments of the disclosure. As an example, the extended audio object may comprise a "beach front" with a big wave. Other examples may be known to the person skilled in the art. The example audio scene may be applied for implementing 6DoF audio rendering in a virtual or augmented reality environment. In the embodiment, an object extent 201 is shown as the extended audio object having a two-dimensional or a three-dimensional geometric form which may be oriented in two or three dimensions. An (original) extent representation indicative of the geometric form of the object extent 201 is obtained, including information regarding the extent geometry, position, and orientation as well as information on audio sources 202 which are associated with the object extent 201. Although the audio sources 202 are illustrated herein as two point sources, any number and other kinds of audio sources may be feasible in the context of the present disclosure. As mentioned above, the audio sources 202 may be recorded audio sources captured using audio sensors (such as microphones, for example). Besides, user positions 203a, 203b, 203c (which for example may be relative positions to the object extent 201) are also obtained. In the illustrated example scene, user 203a and user 203b are located in front of the object extent 201, but with different distances from the object extent 201, while user 203c is located to one side of the object extent 201. However, any other locations may also be included in the scene as user positions.

Figure 2B:
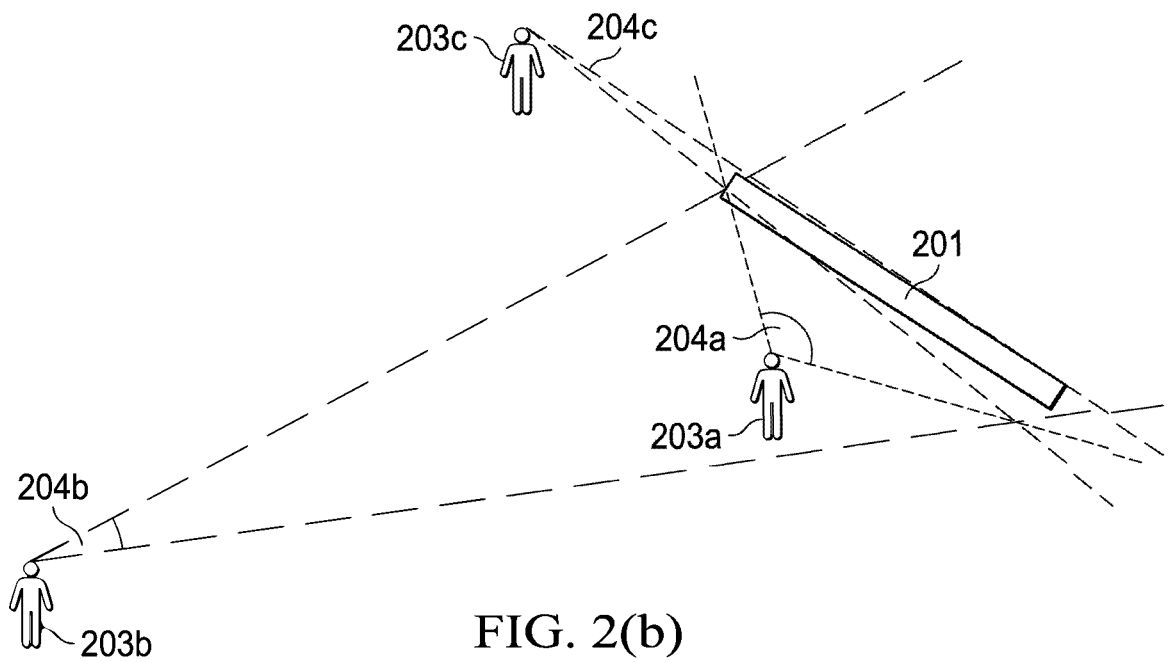
FIG. 2(b) illustrates extent levels for the corresponding user positions within the example audio scene as illustrated in FIG. 2(a) according to embodiments of the disclosure.

FIG. 2(b) illustrates extent levels for the corresponding user positions within the example audio scene illustrated in FIG. 2(a) according to embodiments of the disclosure. Herein, the extent levels 204a, 204b, 204c represent the respective perception of the object extent 201 at the user positions 203a, 203b, 203c. In the embodiment, the extent levels may be defined using an extent parameter that describes a spatial extension of the object extent (extended audio object) perceived at a particular user position. Notably, the perception of the object extent 201 (and therefore, the extent parameter) may depend on a relative user-to-extent geometry position and orientation (e.g., a user position relative to the object extent and/or an orientation of the extent object). For example, as shown in FIG. 2(b), a user may experience a larger extent level 204a at the user position 203a than at the user positions 203b and 203c with corresponding extent levels 204b and 204c, respectively. Thus, it may be beneficial to relate such extent levels to user positions, and to simply use an extent parameter to model extended audio objects for rendering an audio scene within which significant changes of the user positions (i.e., large translational movement) may occur.

Figure 3:
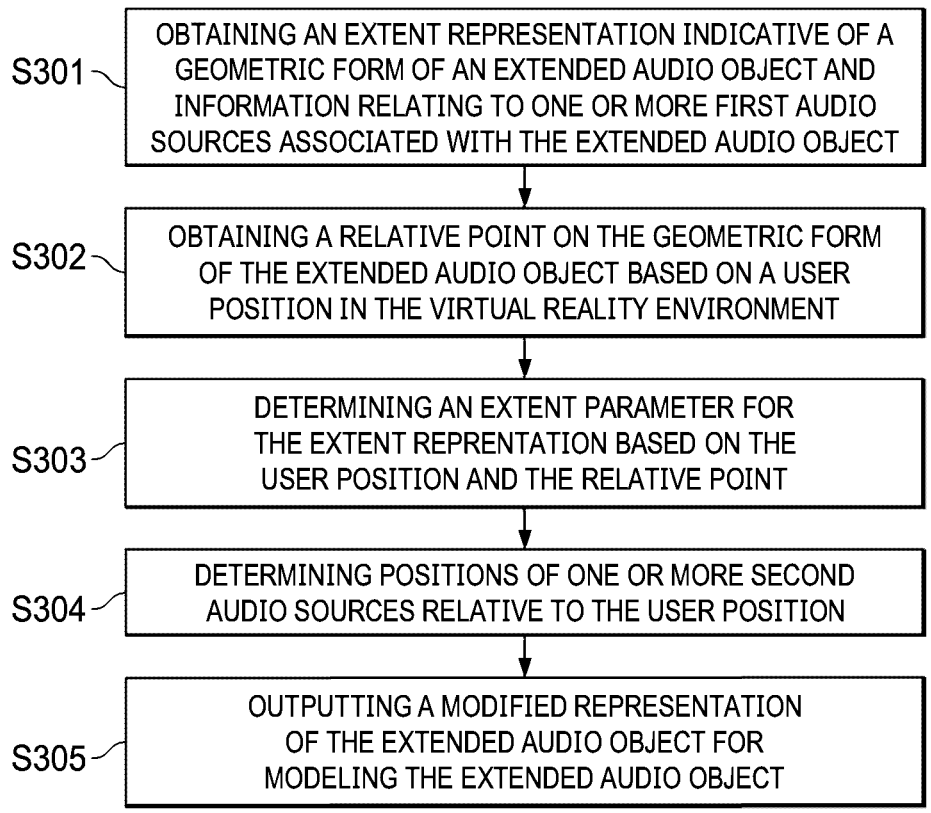
FIG. 3 illustrates an example flow chart for implementing audio rendering of an extended audio object according to embodiments of the disclosure.

FIG. 3 illustrates an example flow chart for implementing audio rendering of an extended audio object according to embodiments of the disclosure. As illustrated, method 300 may be performed for modelling an extended audio object such as extended audio object 101 or object extent 201 for audio rendering in a virtual and/or augmented reality environment. In step 301, an extent representation indicative of a geometric form of the extended audio object and information relating to one or more first audio sources that are associated with the extended audio object is obtained. In step 302, a relative point on the (e.g., extent representation indicative of the) geometric form of the extended audio object is obtained (e.g., determined) based on a user position in the virtual or augmented reality environment. In step 303, an extent parameter (e.g., showing an extent level that represents perceived/spatial extension of the extended audio object) is determined for the extent representation based on the user position and the relative point. As indicated above, the extent parameter may describe a spatial extension of the extended audio object perceived at the user position.

In step 304, positions of one or more second audio sources, relative to the user position, are determined for modelling the extended audio object. Unlike the first audio source(s) which may have been captured through direct recording, the one or more second audio sources may be virtual, reproduced audio sources determined based on the first audio source(s), for example via duplication and/or audio processing (including, for example, filtering), as will be explained in detail below. Subsequently, a modified representation of the extended audio object is output in step 305 for modelling the extended audio object. It is noted that the modified representation may include the extent parameter and the determined positions of the one or more second audio sources for the given user position. Accordingly, the extended audio object can be effectively modeled for a particular user position with simple parameters that contain knowledge of a spatial extent of the extended audio object and/or the corresponding positions of the second audio source(s) as calculated for this particular position.

In other words, the proposed method 300 effectively converts 6DoF data (e.g., input audio object sources, user position, extent geometry of the object, extent position/orientation of the object, etc.) into simple information (e.g., the extent parameter and the positions of the second audio sources included in the modified representation) as input for an extent modeling interface/tool (e.g., the extent modelling tool 103), which may be a legacy interface/tool in some implementations.

Furthermore, a subsequent rendering of the extended audio object may be performed based on the modified representation of the extended audio object. In this case, the extended audio object may be rendered using the determined positions of the one or more second audio sources and the extent parameter. In some embodiments, the rendering may be 6DoF audio rendering of the extended audio object. In this case, a position and/or an orientation and a geometry of the extended audio object in addition to the user position may be obtained for the rendering. Accordingly, the extent parameter may be determined further based on the position and/or the orientation of the extended audio object.

Figure 4:
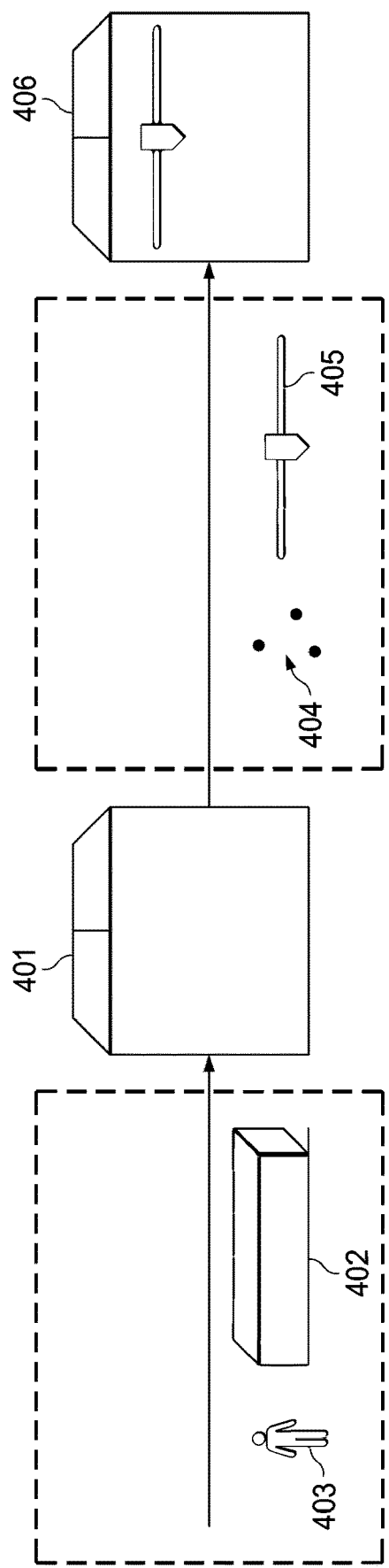
FIG. 4 illustrates an example block diagram for implementing audio rendering of an extended audio object according to embodiments of the disclosure.

FIG. 4 illustrates an example block diagram for implementing audio rendering of an extended audio object according to embodiments of the disclosure. In particular, system 400 comprises an apparatus for modelling extended audio objects for audio rendering in a virtual and/or augmented reality environment. In embodiments, system 400 may be or may be part of a user virtual reality console, such as a headset, computer, mobile phone or any other audio rendering devices for rendering audio in a virtual and/or augmented reality environment.

In some embodiments, the apparatus may be in a form of a parameter converting unit 401, for example comprising a processor configured to perform all steps of the method 300, and a memory coupled to the processor and storing instructions for the processor. In particular, the parameter converting unit 401 may be configured to receive audio scene data such as 6DoF data including, for example, input audio object sources, user position 403 and information regarding extent geometry, position, and/or orientation of the extended audio object 402 (e.g., extended audio object 101 or object extent 201). The parameter converting unit 401 may be further configured to perform the steps 301-305 of method 300 described above. Accordingly, the parameter converting unit 401 converts the received audio scene data into simplified information (e.g., as a modified representation of the extended audio object) including information regarding second (virtual) audio source(s) 404 (e.g., object positions and signal data of the second audio source(s)) and an extent parameter 405 showing an extent level representing perceived/spatial extension of the extended audio object experienced at a particular location. The parameter converting unit 401 may send this (simplified) information either directly or via other processing component to an audio rendering unit (e.g., within or external to the system 400) for outputting audio to a user (or alternatively may be part of the audio rendering unit that outputs audio to a user, e.g., via an appropriate device speaker). Accordingly, the system 400, when being part of an audio rendering device, may transmit the converted parameters (e.g., the above mentioned simplified information related to the modified representation) to an audio output of the audio rendering device.

In some embodiments, the simplified information output by the parameter converting unit 401 may be subsequently provided, as input interface data, to an extent modelling unit 406. The extent modelling unit 406 (also known as an extent modelling tool, e.g., extent modelling tool 103) may control an extent size of the extended audio object (e.g., as rendered), based on the extent parameter included in the simplified information. For example, a perceived size of the extended audio object may be controlled using the extent parameter, by which the extended audio object may be modelled as a point source or a wide source. Accordingly, an appropriate (perceived) size that corresponds to a particular user position can be provided to subsequent rendering (e.g., 6DoF rendering) of the extended audio object, by simply tuning the extent parameter (e.g., extent level). This provides a simplified system for implementing 6DoF rendering of the extended audio object. As a result, detailed information regarding the form/position/orientation of the audio object and the (translational) movement of the user position may not be required for rendering/modelling, which further allows 6DoF rendering to be carried out by the existing audio rendering techniques (e.g., suitable for 3DoF rendering), and thereby also decreasing the computational complexity of 6DoF audio rendering.

In other words, an automatic conversion of 6DoF scene data is provided by the proposed method 300 and/or system 400 for audio extent modelling which may require simple parameters as input interface data, allowing efficient 6DoF rendering of an audio object using available existing systems, without requiring complex data processing for rendering.

Figure 5A:
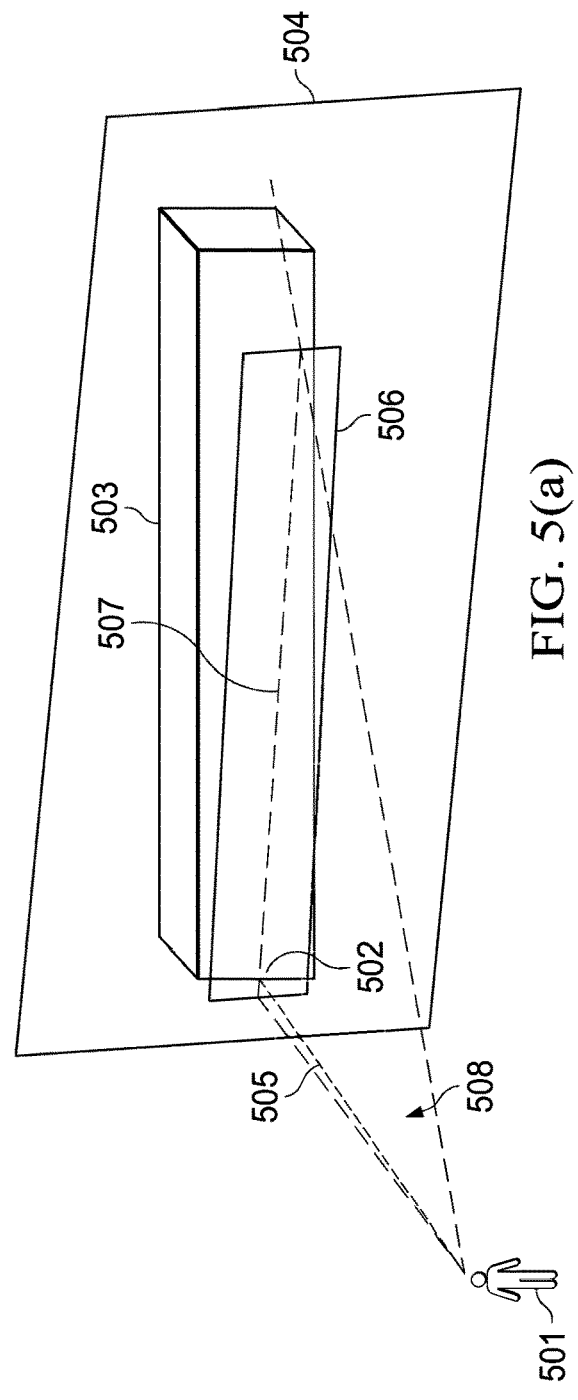
FIGS. 5(a)-5(c) illustrate schematic views for determining a modified representation of the extended audio object as conducted in the method 300 according to embodiments of the disclosure.
Figure 5B:
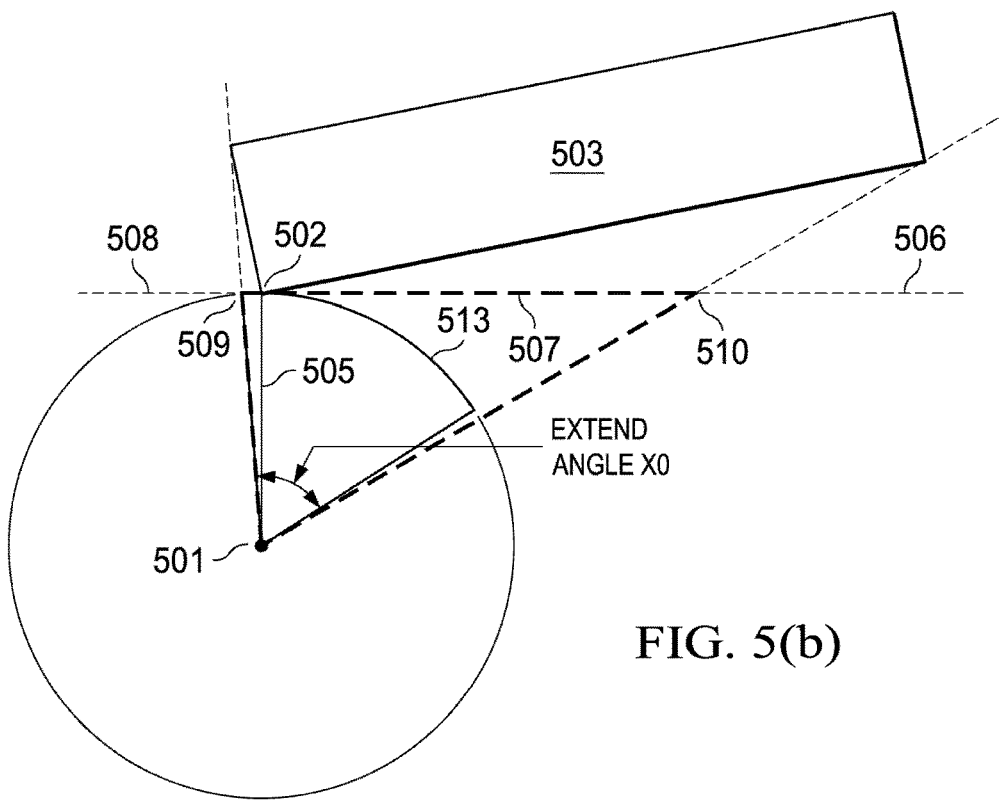
Figure 5C:
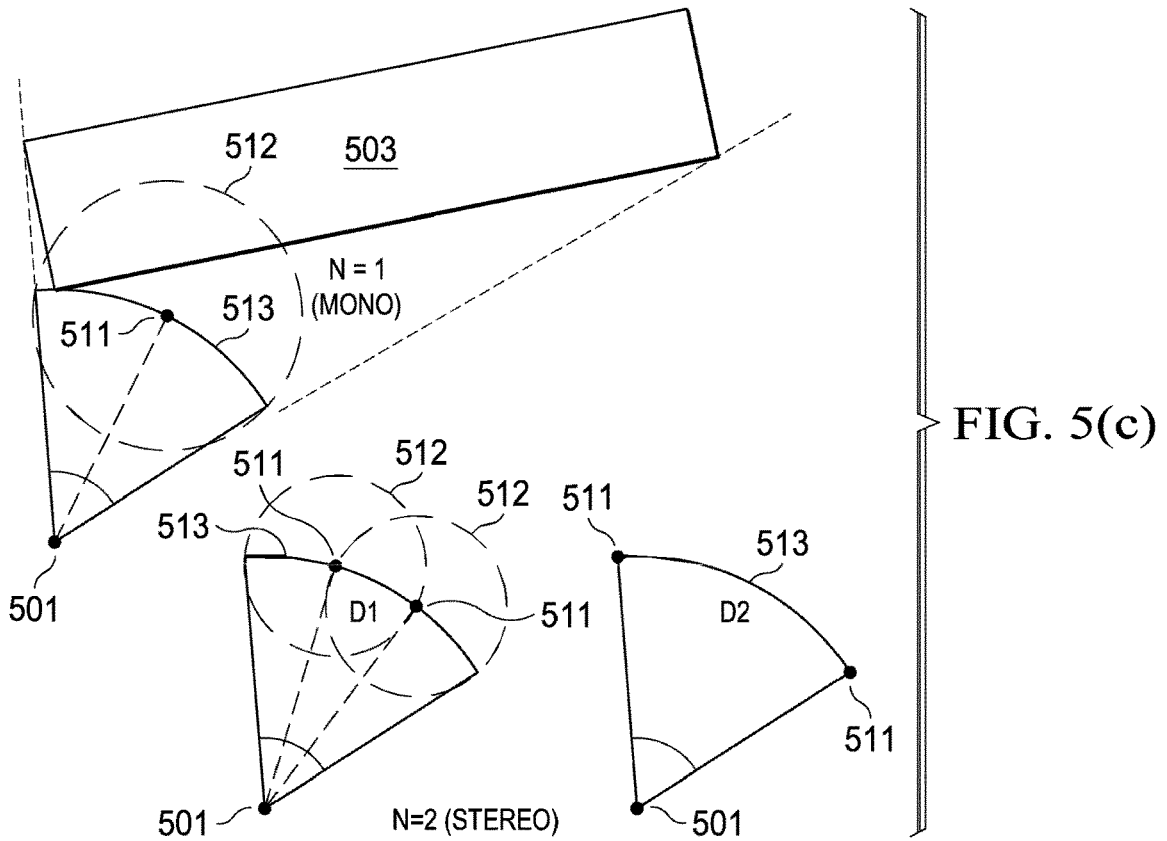

FIGS. 5(a)-5(c) illustrate schematic views for determining a modified representation of the extended audio object as conducted in the method 300 according to embodiments of the disclosure. It is assumed that the extent representation indicates a three-dimensional geometric form for representing a spatial extension of the extended audio object which is oriented in three dimensions. In the example embodiments shown in FIG. 5, the extent representation indicates a cuboid that represents a spatial extension of the extended audio object perceived at a given user position and which may be described as a perceived width, size and/or massiveness of the extended audio object. However, the extent representation may also indicate other solid shapes or more complex geometries for representing an object extent. An example of a first stage that converts a three-dimensional (3D) geometry to a two-dimensional (2D) user observation domain is illustrated in FIG. 5(a). Subsequently, a second stage in the 2D user observation domain determines an extent parameter (e.g., extent levels) for a given user position, as illustrated in FIG. 5(b), and a third stage determines positions of one or more second audio sources according to a one-dimensional (1D) view as illustrated in the example of FIG. 5(c).

As can be seen in the example of FIG. 5(a), a user 501 is located in front of an extended audio object 503 oriented in three dimensions. The extended audio object 503 is represented by a 3D geometric form indicating a spatial extension of the extended audio object 503. According to the example embodiment, a point 502 (e.g., as a relative point) on the geometric form of the extended audio object 503 that is closest to the user 501 may be obtained (e.g., determined). Optionally, a projection plane 504 orthogonal to a first line 505 connecting the user position 501 and the point 502 may be obtained (e.g., determined). On the projection plane 504, an orthogonal projection 506 of the extended audio object 503 may be obtained (e.g., determined). Subsequently, a second line 507 characterizing a horizontal size (e.g., on the projection) of the extended audio object 503 may be obtained (e.g., determined). The second line 507 may form, together with the first line 505, a plane 508 (e.g., as an observation plane). Accordingly, the first stage illustrated in FIG. 5(a) converts the 3D geometry of the extended audio object 503 to the 2D observation plane 508.

As can be seen in the example of FIG. 5(b), a plurality of boundary points 509, 510 may be determined on the orthogonal projection 506. In particular, the boundary points 509, 510 may comprise the left-most and right-most boundaries of the perspective projection 506 on the second line 507. Hence, the plurality of boundary points 509, 510 may identify a projection size of the extended audio object 503. Using the determined boundary points 509, 510 and the user position 501, an extent angle $x^\circ$ that represent an extent level (e.g., as the extent parameter) may be calculated accordingly, for example by trigonometric calculation. That is, the extent angle $x^\circ$ may be determined as an angle between the two lines connecting the user position 501 and the boundary points 509, 510 respectively. As mentioned above, the extent angle $x^\circ$ may therefore refer to a relative arc measure (i.e., a relative extent angle) that depends on the relative point, and the position and/or orientation of the extended audio object. Moreover, a circle arc 513 may be also determined based on the user position 501, the relative point 502, and the geometric form of the extended audio object 503. Notably, the circle arc 513 may be an arc that relates to the extent angle $x^\circ$ as a corresponding arc measure at the user position 501 and may be determined based on the extent angle $x^\circ$ and the user position 501.

As mentioned above, the position and/or the orientation of the extended audio object may also be used for determining the extent parameter. More specifically, the user position 501, the relative point 502, and the position and/or orientation of the extended audio object 503 may be used to determine the extent angle $x^\circ$ on which the extent parameter may be based. As noted above, the extend angle $x^\circ$ may be determined (e.g., calculated) by use of trigonometric operations. It may be further appreciated that the determined extent level (e.g., as a scalar quantity) and therefore the corresponding arc as obtained at this stage may be used for audio source positioning, as conducted at the third stage described below.

After determining the extent angle $x^\circ$ and the corresponding circle arc 513, one or more second audio sources 511 may be positioned on the circle arc 513, as illustrated in the example of FIG. 5(c). It may be noted that the audio sources positioned on the arc 513 may be equally loud for the user 501 (e.g., may be perceived as equally loud) and may have the same reference distance. Optionally, the number (count) of the second audio sources 511 may be determined based on the extent angle $x^\circ$. For example, only one second audio source (N=1) may be applied for small angles, while more than one second audio sources (N>1) may be applied for large angles. That is, the number of the second audio source(s) 511 may increase as the extent angle $x^\circ$ increases. Alternatively, the number N of the second audio source(s) 511 may be a predetermined constant independent of the user position 501 and/or the relative point 502 (e.g., independent of the extent angle $x^\circ$, an extent level 512, and the length of the circle arc 513).

Subsequently, the extent level 512 may be set/determined depending on the (relative) extent angle $x^\circ$ and the number N of the second audio source(s) 511, for modelling the extended audio object 503. In particular, the second audio source(s) 511 may be placed/positioned on the circle arc 513. In case of more than one second audio sources (i.e., N>1), these available N audio sources 511 may be positioned on the circle arc 513 so that all second audio sources 511 are equally loud (i.e., perceived as equally loud) for the user and/or have the same reference distance calculated from the points on the arc 513, (e.g., the distance from the user position to the relative point 502) for proper distance attenuation. For example, the second audio sources 511 may be equidistantly distributed on the circle arc 513, namely, may be placed/positioned on the circle arc 513 with a same distance separating adjacent second audio sources 511 from each other. In some embodiments where two or more second audio sources are taken into account, the positioning may be dependent on a correlation level between the second audio sources 511 and/or a content creator's intent, as shown in the cases of N=2 in the example of FIG. 5(c). For example, respective pairs of adjacent second audio sources 511 may have different levels of decorrelation (e.g., as per their original recording or (additional/artificial) processing, such as duplication, decorrelation filtering, etc.). The distance D2 between the pair of second audio signals 511 having high (or higher) level of decorrelation may be greater than the distance D1 between a pair of second audio signals 511 having low (or lower) level of decorrelation.

It may be further noted that the one or more second audio sources 511 may be determined from the (original) first audio sources, for example by increasing the number of the first audio source(s). This can be achieved by replicating the one or more first audio sources and/or by adding weighted mixes of the one or more first audio sources, and then applying a decorrelation process to the replicated and/or added first audio sources. For example, when only one or few first audio sources have been recorded/captured for the extended audio object, the number of the audio sources can be increased by replication of the one or few first audio sources, for determining the second audio sources. Alternatively, in case of a plurality of the first audio sources, the second audio sources may be determined by adding weighted mixes of them. Subsequent application of a signal decorrelation process may be performed to obtain the final second audio sources.

FIG. 6 illustrates another schematic view of an example for determining a modified representation of the extended audio object (e.g., as conducted in the method 300) according to embodiments of the disclosure. While FIG. 5 illustrates a cuboid for representing a spatial extension of the extended audio object 503, the example of FIG. 6 shows a case where an extended audio object 603 may have a complex geometry (e.g., a vehicle). Similar to the embodiments of FIG. 5, a user 601 is located in front of the extended audio object 603 oriented in three dimensions. In this example embodiment, however, a simplified extent representation 605 showing for example an ellipsoid may be obtained before applying step 301 of proposed method 300 in order to simplify steps 301 and 303. In other words, for those embodiments where an extent object has a complex geometry, the method 300 may further comprise obtaining a simplified geometric form (simplified extent geometry) 605 of the extended audio object for use in determining the relative point, prior to or for obtaining the relative point on the geometric form of the extended audio object. Accordingly, a simplified orthogonal projection 606 of the extended audio object 603 may be obtained for the subsequent determination of the extent angle/level 604 as explained above.

Returning to FIG. 5, the second audio sources 511 may be positioned on the circle arc 513 to have the same reference distance with respect to the user position 501. It may be appreciated that the reference distance specifies a distance (e.g., a user-source distance) at which—independently from the distance attenuation law used—the computed attenuation of the audio source elements is minimum, e.g. 0 dB. For object sources with extent, such a user-source distance may be measured relative to the origin of the extent (e.g., its "position" attribute) or relative to the extent itself, as shown in the examples of FIG. 7(*a*) and FIG. 7(*b*), respectively. In the example of FIG. 7(*a*), the reference distance $D_{ref}$ is defined relative to the origin point 702*a* of the object extent 701*a*, while in the example of FIG. 7(*b*), the reference distance $D_{ref}$ is defined relative to the closest point of the object extent 701*b*, as also indicated by the relative point 502 in the example of FIG. 5. Therefore, with reference to FIGS. 7(*a*) and 7(*b*), the relative point closest to the user position will be located on the dashed lines. In the example of FIG. 7(*a*), the relative point is located at the reference distance $D_{ref}$ from the origin 702*a* of the object extent 701*a*. In the example of FIG. 7(*b*), the relative point is located at the reference distance $D_{ref}$ from the object extent 701*b*. With reference to FIG. 5(*b*), since the relative point 502 (e.g., as the closest point to the user 501) is also located on the arc 513, the second audio sources placed on the arc 513 have the same reference distance as the relative point 502, at which the attenuation may reveal a minimum.

Figure 8A:
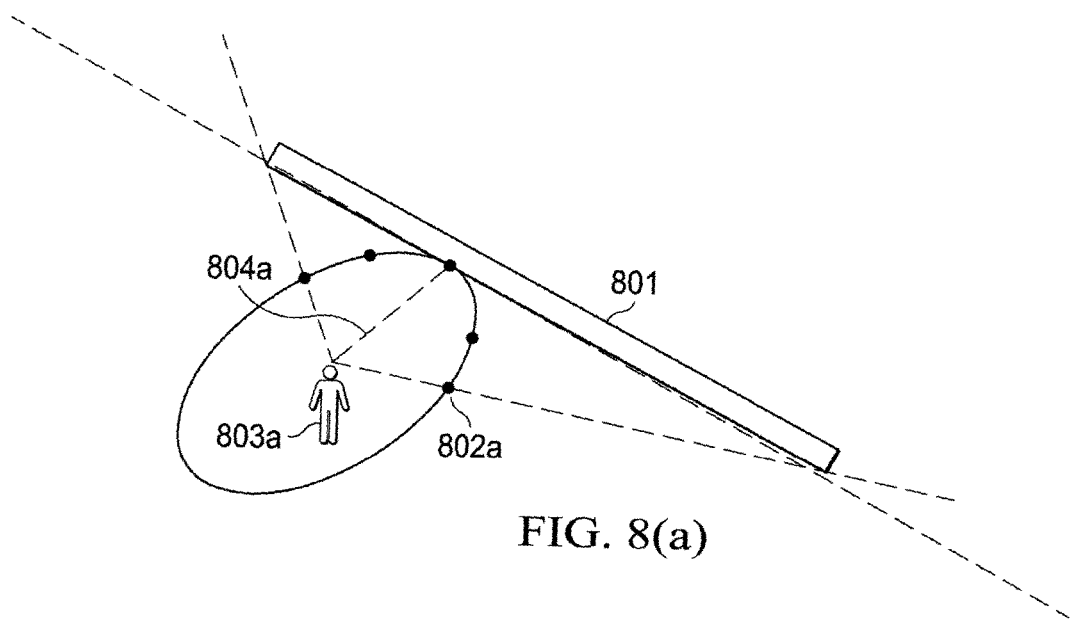
FIGS. 8(a)-(c) illustrate respective resulting modified representations of the extended audio object for different user positions as depicted in FIG. 2 according to embodiments of the disclosure.
Figure 8B:
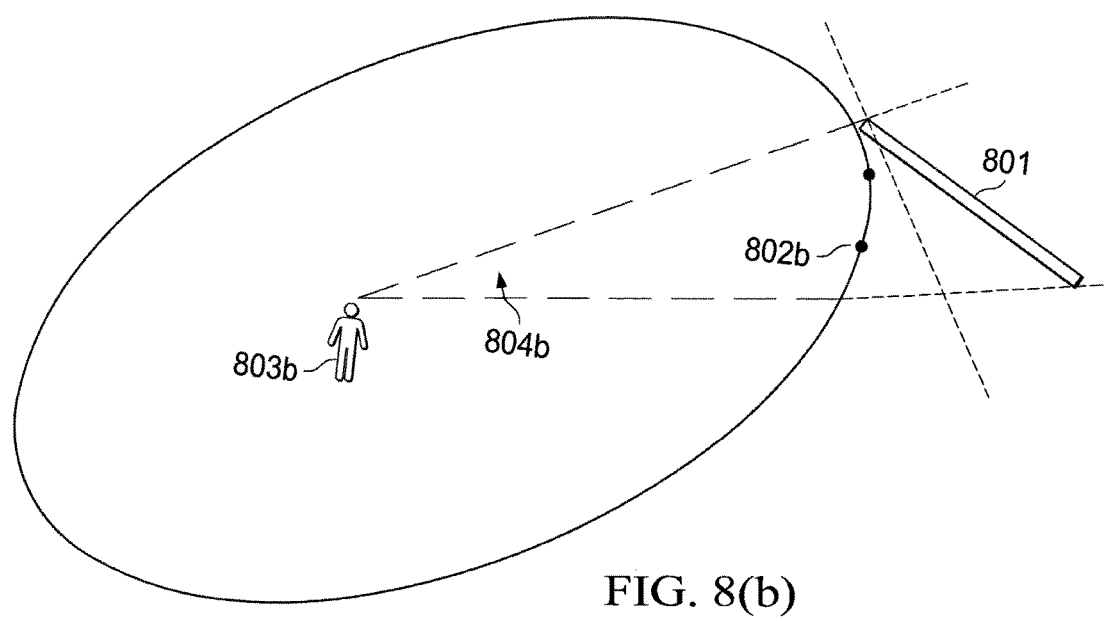
Figure 8C:
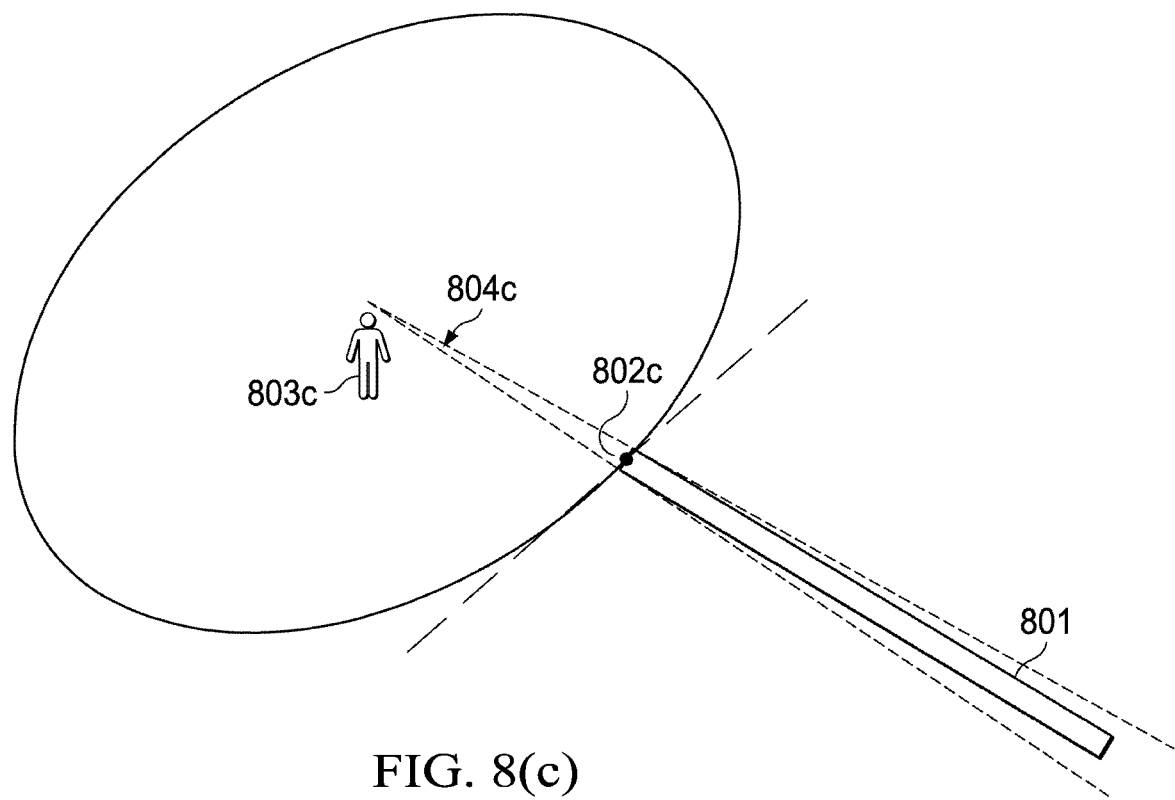

FIGS. 8(*a*)-(*c*) illustrate examples of respective resulting modified representations of the extended audio object for different user positions as depicted in FIG. 2 according to embodiments of the disclosure. Similar to the audio scene illustrated in FIG. 2, user 803*a* and user 803*b* are located in front of an object extent 801 but with different distances from the object extent 801, while user 803*c* is located to one side of the object extent 801. It may be appreciated that any other locations may also be included in the scene as user positions. Accordingly, the resulting extent levels 804*a*, 804*b*, 804*c* represent the respective perception (e.g., spatial extension) of the object extent 801 at the user positions 803*a*, 803*b*, 803*c*. As shown in the example of FIG. 8, the resulting extent level 804*a* at the user position 803*a* is greater than the resulting extent level 804*b* at the user position 803*b*, which may also allow a greater number of the second audio sources 802*a* to be determined (and placed) for modelling the object extent 801. Similarly, the resulting extent level 804*b* at the user position 803*b* is greater than the resulting extent level 804*c* at the user position 803*c*, which may also allow a greater number of the second audio sources 802*b* to be determined (and placed) for modelling the object extent 801. In this example, the modified representation for the user position 803*a* contains five second audio sources 802*a*, the modified representation for the user position 803*b* contains two second audio sources 802*b*, and the modified representation for the user position 803*c* contains only one second audio source 802*c*.

Interpretation

Aspects of the systems described herein may be implemented in an appropriate computer-based sound processing network environment (e.g., server or cloud environment) for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes, or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Specifically, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software-based devices, as well as a plurality of different structural components, may be utilized to implement the embodiments. For example, "content activity detectors" described herein can include one or more electronic processors, one or more computer-readable medium modules, one or more input/output interfaces, and various connections (e.g., a system bus) connecting the various components.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Enumerated Example Embodiments

Various aspects and implementations of the present disclosure may also be appreciated from the following enumerated example embodiments (EEEs), which are not claims.

EEE1. A method of modelling extended audio objects for audio rendering in a virtual or augmented reality environment comprising: obtaining an extent representation indicative of a geometric form of an extended audio object and information relating to one or more first audio sources that are associated with the extended audio object: obtaining a relative point on the geometric form of the extended audio object based on a user position in the virtual or augmented reality environment: determining an extent parameter for the extent representation based on the user position and the relative point, the extent parameter describing a spatial extension of the extended audio object perceived at the user position; determining positions of one or more second audio sources, relative to the user position, for modelling the extended audio object: and outputting a modified representation of the extended audio object for modelling the extended audio object, the modified representation including the extent parameter and the positions of the one or more second audio sources.

EEE2. The method of EEE1, further comprising determining the one or more second audio sources for modelling the extended audio object based on the one or more first audio sources.

EEE3. The method of EEE1 or EEE2, wherein the extent parameter is determined further based on a position and/or an orientation of the extended audio object.

EEE4. The method of EEE3, further comprising determining a relative extent angle based on the user position, the relative point, and the position and/or orientation of the extended audio object, wherein the extent parameter is determined based on the relative extent angle.

EEE5. The method of any one of EEE1 to EEE4, wherein determining the positions of the one or more second audio sources comprises determining a circle arc based on the user position, the relative point, and the geometric form of the extended audio object: and positioning the determined one or more second audio sources on the circle arc.

EEE6. The method of EEE5, wherein the positioning involves equidistantly distributing all the second audio sources on the circle arc.

EEE7. The method of EEE5 or EEE6, wherein the positioning is dependent on a correlation level between the second audio sources and/or a content creator intent.

EEE8. The method of any one of EEE2 to EEE7, wherein the extent parameter is determined further based on a number of the determined one or more second audio sources.

EEE9. The method of EEE8, wherein the number of the determined one or more second audio sources is a predetermined constant independent of the user position and/or the relative point.

EEE10. The method of EEE8 when referring to EEE4, wherein determining the one or more second audio sources for modelling the extended audio object comprises determining the number of the one or more second audio sources based on the relative extent angle.

EEE11. The method of EEE10, wherein the number of the one or more second audio sources increases as the relative extent angle increases.

EEE12. The method of any one of EEE2 to EEE11, wherein determining the one or more second audio sources for modelling the extended audio object further comprises replicating the one or more first audio sources or adding weighted mixes of the one or more first audio sources: and applying a decorrelation process to the replicated or added first audio sources.

EEE13. The method of any one of EEE1 to EEE12, wherein the extent representation indicates a two-dimensional or a three-dimensional geometric form for representing a spatial extension of the extended audio object.

EEE14. The method of any one of EEE1 to EEE13, wherein the extended audio object (3) is oriented in two or three dimensions.

EEE15. The method of any one of EEE1 to EEE14, wherein the spatial extension of the extended audio object perceived at the user position is described as a perceived width, size and/or massiveness of the extended audio object.

EEE16. The method of any one of EEE1 to EEE15, wherein the relative point is a point on the geometric form of the extended audio object closest to the user position.

EEE17. The method of any one of EEE4 to EEE16, further comprising obtaining an orthogonal projection of the extended audio object on a projection plane orthogonal to a first line connecting the user position and the relative point: and determining, on the orthogonal projection, a plurality of boundary points identifying a projection size of the extended audio object, wherein the relative extent angle is determined using the user position and the plurality of boundary points.

EEE18. The method of EEE17, wherein determining the plurality of boundary points comprises obtaining a second line relating to a horizontal projection size of the extended audio object, wherein the plurality of boundary points comprises a left-most boundary point and a right-most boundary point of the orthogonal projection on the second line.

EEE19. The method of EEE18, wherein the horizontal projection size is a maximum size of the extended audio object.

EEE20. The method of any one of EEE17 to EEE19, wherein the orthogonal projection comprises a simplified projection of the extended audio object having a complex geometry.

EEE21. The method of EEE20, further comprising, prior to obtaining the relative point on the geometric form of the extended audio object, obtaining a simplified geometric form of the extended audio object for use in determining the relative point.

EEE22. The method of any one of EEE1 to EEE21, further comprising rendering the extended audio object based on the modified representation of the extended audio object, wherein the extended audio object is rendered using the determined positions of the one or more second audio sources and the extent parameter.

EEE23. The method of EEE22, wherein the rendering comprises 6DoF audio rendering, further comprising obtaining the user position, a position and/or an orientation and a geometry of the extended audio object for the rendering.

EEE24. The method of any one of EEE1 to EEE23, further comprising controlling a perceived size of the extended audio object using the extent parameter.

EEE25. The method of EEE24, wherein the extended audio object is modelled as a point source or a wide source by controlling the perceived size of the extended audio object.

EEE26. The method of any one of EEE1 to EEE25, wherein the positions of the one or more second audio sources are determined so that all the second audio sources have a same reference distance from the user position.

EEE27. An apparatus for modelling extended audio objects for audio rendering in a virtual or augmented reality environment, the apparatus comprising a processor and a memory coupled to the processor and storing instructions for the processor, wherein the processor is configured to perform all steps of the method according to any one of EEE1 to EEE26.

EEE28. A system for implementing audio rendering in a virtual or augmented reality environment, the system comprising: the apparatus according to EEE27; and an extent modelling unit configured to receive, from said apparatus, information relating to the modified representation of the extended audio object and to control an extent size of the extended audio object based on said information relating to the modified representation.

EEE29. The system according to EEE28, wherein the system is or is part of a user virtual reality console.

EEE30. The system according to EEE28 or EEE29, wherein the system is configured to transmit said information relating to the modified representation and/or the controlled extent size of the extended audio object to an audio output.

EEE31. A computer program comprising instructions that, when executed by a computing device, cause the computing device to perform all steps of the method according to any one of EEE1 to EEE26.

EEE32. A computer-readable storage medium storing the computer program according to EEE31.

The invention claimed is:

1. A computer-implemented method of modelling extended audio objects for audio rendering in a virtual or augmented reality environment, the method comprising:
obtaining an extent representation indicative of a geometric form of an extended audio object and information relating to one or more first audio sources that are associated with the extended audio object;
obtaining a relative point closest to a user position in the virtual or augmented reality environment, using the extent representation indicative of the geometric form of the extended audio object, wherein obtaining the relative point using the extent representation indicative of the geometric form of the extended audio object comprises obtaining the relative point on the geometric form;
determining an extent parameter for the extent representation based on the user position and the relative point, the extent parameter describing a spatial extension of the extended audio object perceived at the user position;
determining positions of one or more second audio sources, relative to the user position, for modelling the extended audio object; and
outputting a modified representation of the extended audio object for modelling the extended audio object, the modified representation including the extent parameter and the positions of the one or more second audio sources.

2. The computer-implemented method according to claim 1, further comprising determining the one or more second audio sources for modelling the extended audio object based on the one or more first audio sources.

3. The computer-implemented method according to claim 1, wherein determining the positions of the one or more second audio sources comprises:
determining a circle arc based on the user position, the relative point, and the geometric form of the extended audio object; and
positioning the determined one or more second audio sources on the circle arc.

4. The computer-implemented method according to claim 3, wherein the positioning involves equidistantly distributing all the second audio sources on the circle arc.

5. The computer-implemented method according to claim 3, wherein the positioning is dependent on a correlation level between the second audio sources and/or a content creator intent.

6. The computer-implemented method according to claim 2, wherein the extent parameter is determined further based on a number of the determined one or more second audio sources.

7. The computer-implemented method according to claim 6, wherein the number of the determined one or more second audio sources is a predetermined constant independent of the user position and/or the relative point.

8. The computer-implemented method according to claim 4, wherein determining the one or more second audio sources for modelling the extended audio object comprises determining the number of the one or more second audio sources based on the relative extent angle.

9. The computer-implemented method according to claim 8, wherein the number of the one or more second audio sources increases as the relative extent angle increases.

10. The computer-implemented method according to claim 2, wherein determining the one or more second audio sources for modelling the extended audio object further comprises:
replicating the one or more first audio sources or adding weighted mixes of the one or more first audio sources; and
applying a decorrelation process to the replicated or added first audio sources.

11. The computer-implemented method according to claim 1, wherein the extent representation indicates a two-dimensional or a three-dimensional geometric form for representing a spatial extension of the extended audio object.

12. The computer-implemented method of claim 1, wherein the extended audio object is oriented in two or three dimensions.

13. The computer-implemented method of claim 1, wherein the spatial extension of the extended audio object perceived at the user position is described as a perceived width, size and/or massiveness of the extended audio object.

14. The computer-implemented method according to claim 1, further comprising controlling a perceived size of the extended audio object using the extent parameter.

15. The computer-implemented method according to claim 14, wherein the extended audio object is modelled as a point source or a wide source by controlling the perceived size of the extended audio object.

16. The computer-implemented method of claim 1, wherein the positions of the one or more second audio sources are determined so that all the second audio sources have a same reference distance from the user position.

17. An apparatus for modelling extended audio objects for audio rendering in a virtual or augmented reality environment, the apparatus comprising a processor and a memory coupled to the processor and storing instructions for the processor, wherein the processor is configured to perform all steps of the computer-implemented method according to claim 1.

18. A system for implementing audio rendering in a virtual or augmented reality environment, the system comprising:
an apparatus for modelling extended audio objects for audio rendering in a virtual or augmented reality environment, the apparatus comprising a processor and a memory coupled to the processor and storing instructions for the processor, wherein the processor is configured to perform all steps of the computer-implemented method according to claim 1; and
an extent modelling unit configured to receive, from said apparatus, information relating to the modified representation of the extended audio object and to control an extent size of the extended audio object based on said information relating to the modified representation,
wherein the system is configured to transmit said information relating to the modified representation and/or the controlled extent size of the extended audio object to an audio output.

* * * * *